Patented Mar. 17, 1942

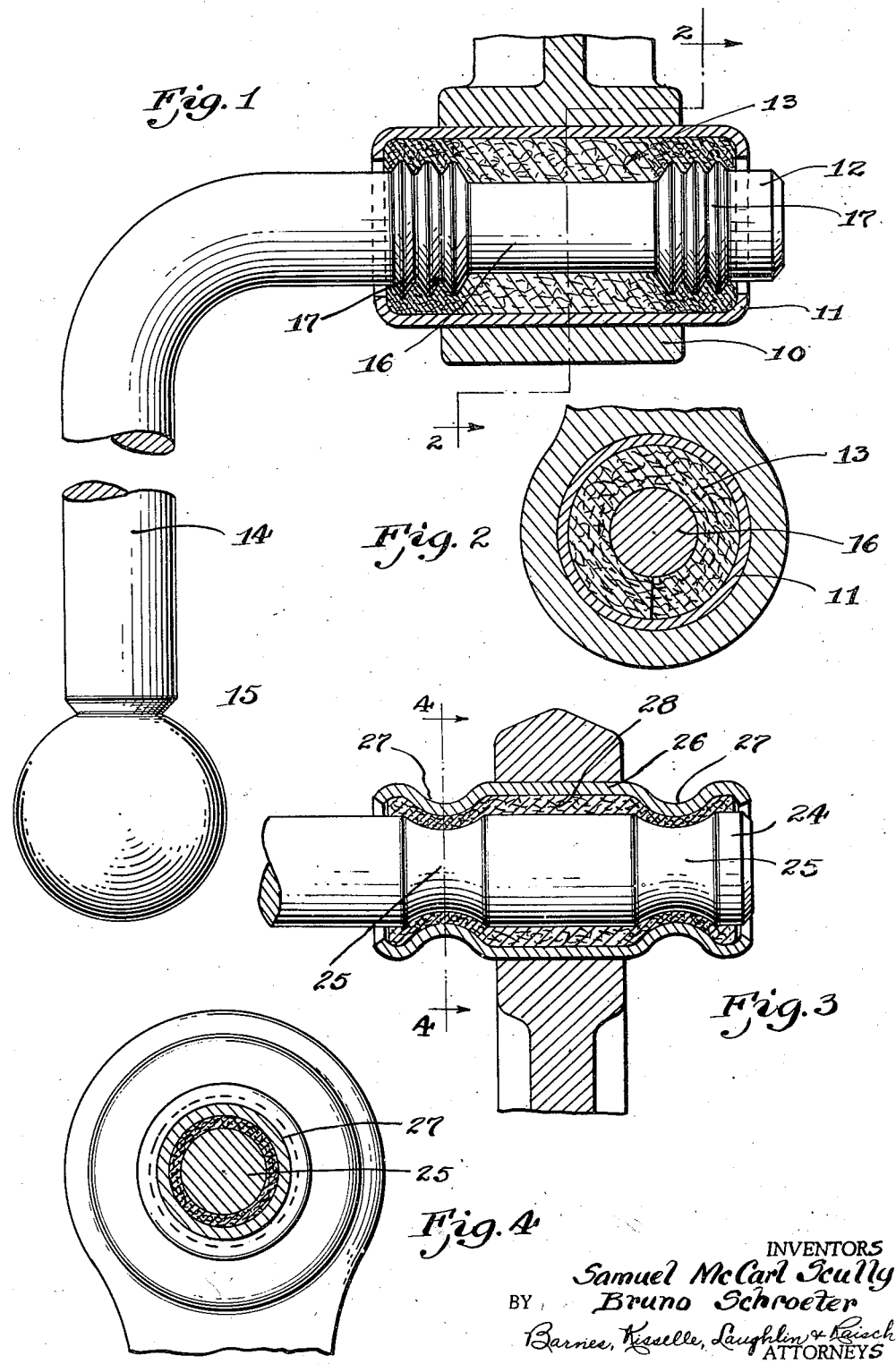

2,276,349

UNITED STATES PATENT OFFICE 2,276,349

BEARING CONSTRUCTION

Samuel McCarl Scully and Bruno Schroeter, Detroit, Mich., assignors to O. & S. Bearing Company, Detroit, Mich., a corporation of Michigan Application November 18, 1940, Serial No. 366,048

8 Claims. (Cl. 308—240)

This invention relates to a bearing construction. More specifically the invention relates to a self lubricating bearing, the object of which is to provide a low torque and still avoid belling of the bearing material or outer bearing member throughout the life of the bearing. It is an object of the invention is to provide a bearing design particularly adapted to be used in the ends of shafts which are subjected not only to rotating movement, but also to oscillation forces. The usual type of self lubricated bearing is that which consists of an inner bearing member and a bushing which comprises a mass of lubricant impregnated bearing material contained within an outer shell. Upon continued use of a low torque bearing in certain applications it has been found that the bearing material and the outer shell member have a tendency to bell out at the ends. This reduces the bearing efficiency considerably by eventually permitting pounding and also reducing the end thrust of the bearing. The objects of the present invention, as specifically stated, contemplate a bearing construction which avoids the difficulties of the present designs.

Other objects and features of the invention having to do with details of construction and operation will be brought out in the following description and claims.

In the drawing:

Fig. 1 is a sectional view of a preferred embodiment.

Fig. 2 is a section on line 2—2 of Fig. 1.

Fig. 3 is a sectional view of a modified form of the invention.

Fig. 4 is a section on line 4—4 of Fig. 3.

In Fig. 1 a bearing support 10 holds an outer bearing shell 11 in which is contained an inner bearing member 12. Between the inner bearing member and the outer shell 11 is the bearing material 13. The inner bearing member is extended into an arm 14 having a ball 15 on the end thereof. In the application of the bearing, inner member 12 will not only be subjected to rotating forces, but there will also be oscillating forces acting on it which tend to pivot the inner member longitudinally within the shell 11. In the present construction the inner member has a reduced diameter 16 at the central portion thereof while at the ends within the shell 11 are formed annular enlargements 17. The material 13 is a fibrous woven material preferably made of cotton, which, in the formation of the bearing, is wrapped around the inner member as a strip. The strip is then compressed and the outer shell 11 applied to form the permanent assembly. When compression is applied to the material it will be seen that much greater compression will result at the ends than at the center portion due to the contour of the inner member. The ends of the shell 11 are, of course, formed over the material 13 at the completion of the assembly. The result of this particular arrangement is a high compression of the material 13 at the ends and low compression in the center. The effect of the construction has been to eliminate the belling tendency of the bearing. The resistance of the bearing to end thrust is not decreased by the construction.

In Fig. 3, a modified form of the invention is shown, and in this figure the inner bearing member 24 is provided with annular restrictions 25 at the ends thereof. When an outer shell 26 is applied, the ends are embossed at 27 to register and cooperate with the annular restrictions 25, this embossing being to the extent that the compression of bearing material 28 between the two members is much greater at the ends than at the center. The non-belling effect is also achieved in this embodiment of Fig. 3. The annular restrictions 25 provide end thrust resistance.

We claim:

1. A bearing comprising an inner bearing member having a cylindrical contour with an enlarged diameter at each end and a reduced diameter between the enlarged portions, a cylindrical outer bearing member, and a heavy lubricant material compressed between said members, the compression of said material being greatest at said enlarged portions of the inner member and least at the central reduced portion thereof.

2. A bearing comprising an inner bearing member of cylindrical shape and provided with annular restrictions at the ends thereof, an outer bearing member, a heavy lubricant material between said members, said outer bearing member being originally cylindrical in shape and being deformed at the ends to compress said lubricant material into said restrictions, the lubricant material in said restrictions being under relatively greater pressure than the lubricant at the center portion of the bearing.

3. A bearing comprising an inner bearing member, an outer bearing member, and a strip of lubricant impregnated material wrapped around said inner member and compressed between said members, one of said members being formed to exert an abrupt increase in pressure on said material for a defined portion directly at the ends of said members relative to the pressure at the center portion thereof.

4. A bearing of the oscillatable type comprising an inner bearing member, an outer bearing member, a bushing of compressible-expansible material substantially surrounding said inner member and compressed between the surfaces of said two bearing members, said outer and inner bearing members having end portions so formed and cooperating to provide abrupt changes in clearance between said members to maintain said material under a high degree of compression for a defined portion directly adjacent the ends of said members and to permanently lock the bearing members against relative axial movement.

5. A bearing of the oscillatable type comprising an inner bearing member, an outer bearing member, a bushing of compressible-expansible material substantially surrounding said inner member and compressed between the surfaces of said two bearing members, enlarged grooved ends on said inner bearing member within said outer member and serving to give a relatively high compression to said material at the ends of said members and to permanently lock the bearing members against relative axial movement.

6. A bearing of the oscillatable type comprising an inner bearing member, an outer bearing member, a bushing of compressible-expansible material substantially surrounding said inner member and compressed between the surfaces of said two bearing members, said inner bearing member being provided with annular reduced portions at the ends thereof and said outer member being provided with corresponding annular embossings to cooperate with the inner member to give a relatively high compression to the bearing material at the ends of said members and to permanently lock the bearing members against relative axial movement.

7. A bearing comprising an inner bearing member, an outer bearing member, and a heavy lubricant material confined between said members under relatively great pressure over a definitely defined axially extending portion directly adjacent the ends thereof and confined under relatively lesser pressure between said defined end portions.

8. A bearing comprising an inner bearing member, an outer bearing member and a heavy lubricant material confined between said members, said members having abruptly varying longitudinal contours whereby said material is confined under relatively greater pressure for a defined axial portion directly adjacent the ends than at the center portion thereof.

SAMUEL McCARL SCULLY.
BRUNO SCHROETER.